United States Patent
Lien

(10) Patent No.: US 6,955,222 B2
(45) Date of Patent: Oct. 18, 2005

(54) METHOD FOR SECONDARY OIL RECOVERY

(75) Inventor: Larry A. Lien, Solana Beach, CA (US)

(73) Assignee: GE Osmonics, Inc., Minnetonka, MN (US)

( * ) Notice: Subject to any disclaimer, the term of this patent is extended or adjusted under 35 U.S.C. 154(b) by 0 days.

(21) Appl. No.: 10/343,698

(22) PCT Filed: Aug. 7, 2001

(86) PCT No.: PCT/US01/41595

§ 371 (c)(1),
(2), (4) Date: Jan. 31, 2003

(87) PCT Pub. No.: WO02/12675

PCT Pub. Date: Feb. 14, 2002

(65) Prior Publication Data

US 2004/0007358 A1 Jan. 15, 2004

(30) Foreign Application Priority Data

Aug. 7, 2000 (BR) .............................. 0003677

(51) Int. Cl.$^7$ .............................. E21B 43/20
(52) U.S. Cl. .................... 166/305.1; 166/275; 210/652; 210/500.21
(58) Field of Search .............................. 166/270, 252.3, 166/275, 305.1, 90.1, 268; 210/321.74, 321.83, 652, 654, 321.76, 500.21, 500.37, 500.38

(56) References Cited

U.S. PATENT DOCUMENTS

| 4,259,183 A | 3/1981 | Cadotte | 210/654 |
| 4,723,603 A | 2/1988 | Plummer | 166/275 |
| 4,902,417 A | 2/1990 | Lien | 210/321.74 |
| 5,028,336 A * | 7/1991 | Bartels et al. | 210/639 |
| 5,587,083 A | 12/1996 | Twardowski | 210/652 |
| 5,925,254 A * | 7/1999 | Lemaire et al. | 210/651 |
| 6,068,771 A | 5/2000 | McDermott et al. | 210/321.83 |

FOREIGN PATENT DOCUMENTS

| GB | 1325494 | 1/1970 |
| GB | 1522595 | 10/1974 |
| GB | 1520877 | 10/1975 |

* cited by examiner

Primary Examiner—David Bagnell
Assistant Examiner—Daniel P Stephenson
(74) Attorney, Agent, or Firm—Fitch, Even Tabin & Flannery

(57) ABSTRACT

A method and a system for treating seawater to facilitate secondary recovery of petroleum from a location below a body of saline water by flooding a permeable stratum with the treated water. The system utilizes a spirally-wound cross flow semipermeable membrane cartridge incorporating a three layer membrane arrangement preferably having nanofiltration characteristics which facilitates treatment of open ocean water by a single pass without any chemical or mechanical pretreatment to result in a liquid stream of desired character that can have greater ionic strength than the input seawater, e.g. at least about 18,000 ppm of chloride ion and less than 50 ppm of sulfate ion. This surprising objective is obtained even at high operating temperatures, e.g. as high as about 70° C., through the combination of the construction of the feed spacer and the nanofiltration character of the three layer membrane arrangement.

7 Claims, 2 Drawing Sheets

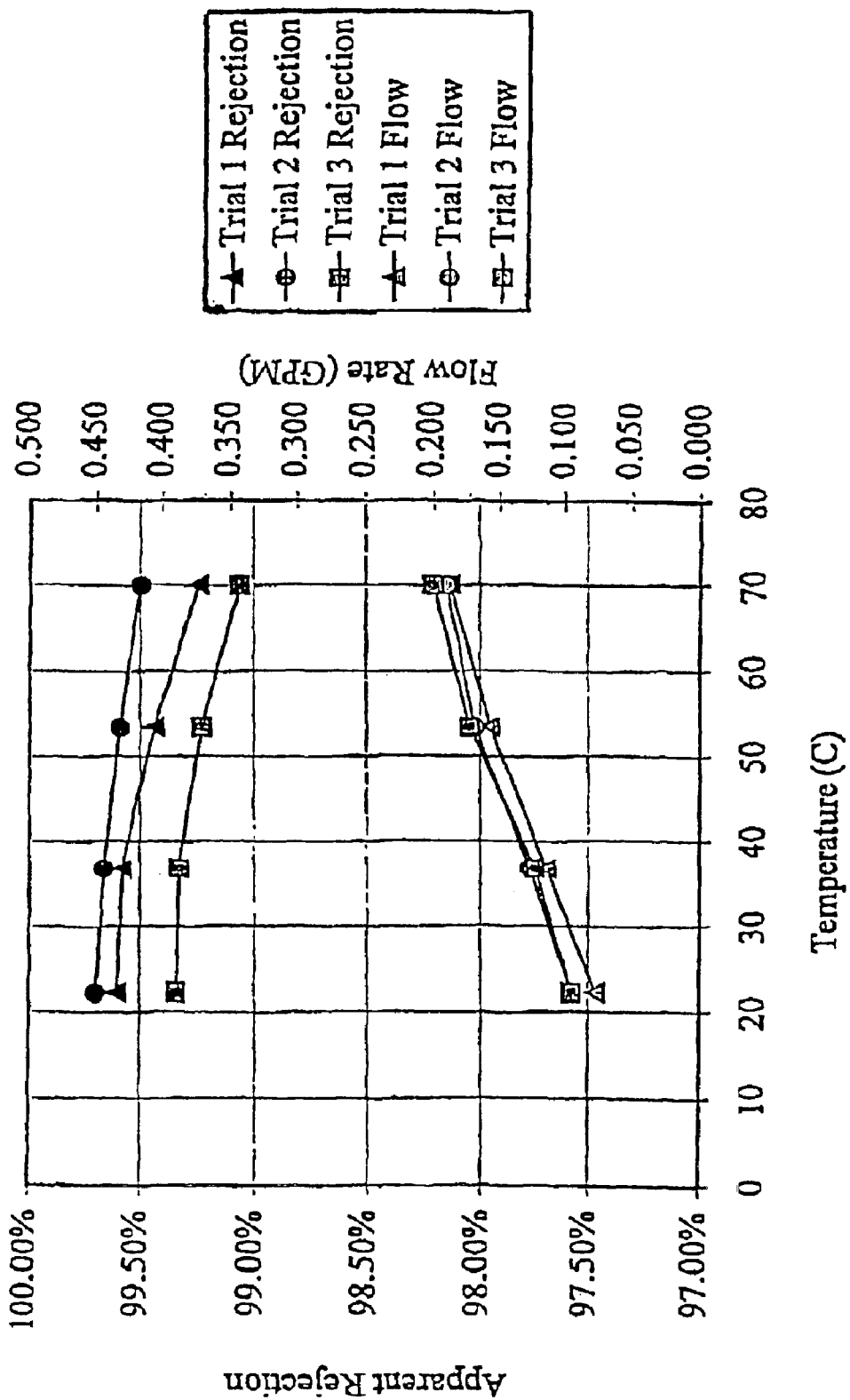
Figure 1. Plot of Apparent Rejection and Permeate Flow Rate vs. Temperature

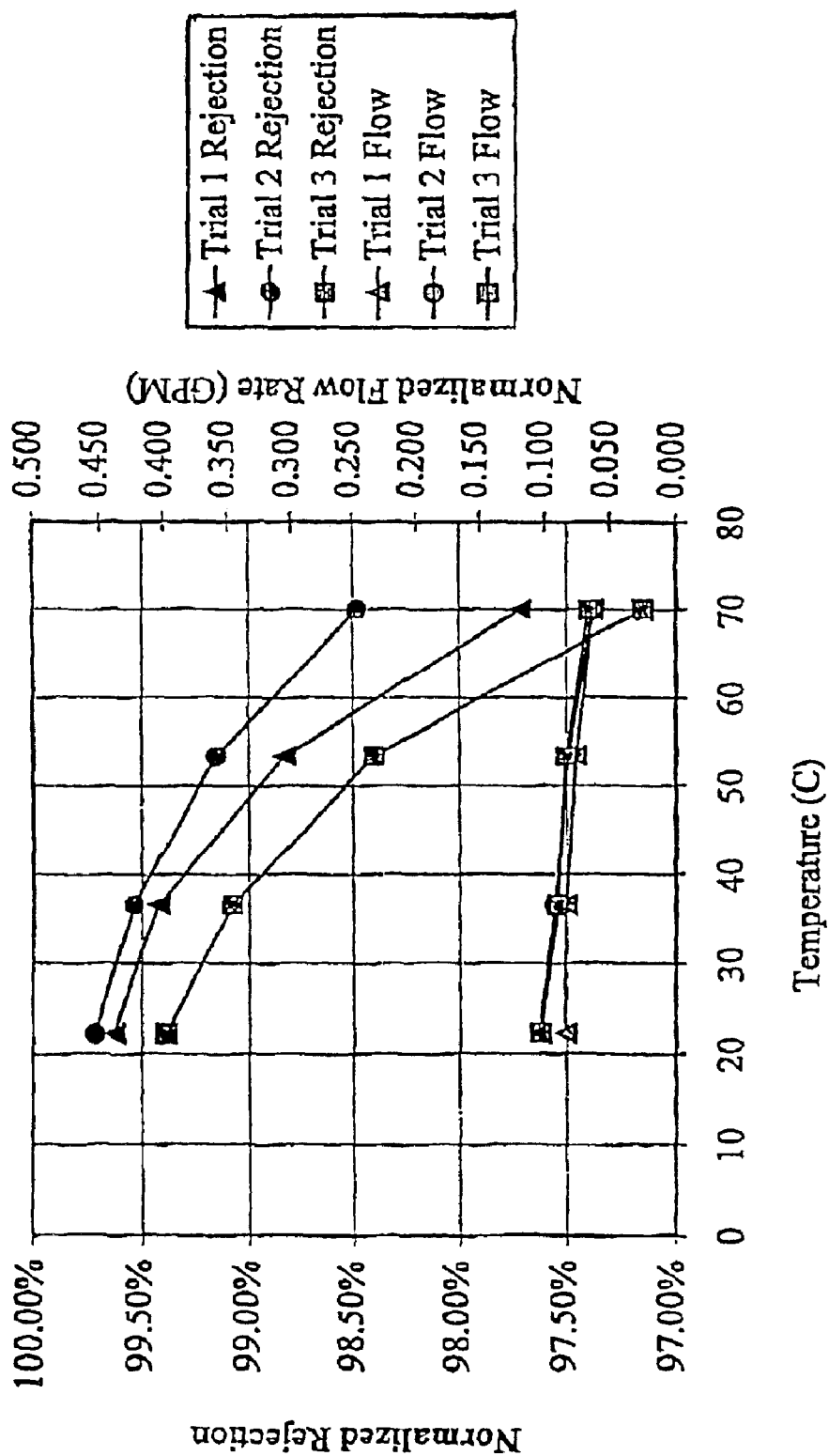
Figure 2. Plot of Normalized Rejection and Normalized Permeate Flow Rate vs. Temperature

METHOD FOR SECONDARY OIL RECOVERY

This application claims priority from Brazilian application PI0003677-3, filed Aug. 7, 2000 and is a 371 filing of PCT/US01/41595, filed Aug. 7, 2001.

This invention relates to a method for oil recovery as a part of enhanced oil production operations, and more particularly relates to a method for secondary oil recovery at a location below a saline body of water and a system for carrying out such a method.

BACKGROUND OF THE INVENTION

Offshore oil production normally involves secondary oil recovery for economical overall production; however, before an oil formation may be flooded by means of a high pressure water jet, the water to be injected should meet certain requirements. Such water should be free from suspended solids and essentially free from sulfate in order to eliminate potential oil reservoir blockage which can be caused by such solids and by less soluble ions, e.g. barium, reacting with sulfate that might be carried in any significant concentration in such injection water. Furthermore, it is important that the injection water should have a similar ionic concentration to that of the oil reservoir water, e.g. chloride ion content, lest clay or other minerals in the formation would be caused to swell as a result of significant difference in ionic strength in water being injected during oil production operation.

The prior art contains processes for water treatment for use in such oil production. Generally, these prior art processes involve the use of softeners, ultrafiltration and/or other membrane techniques in an attempt to provide water having a high chloride ion concentration and a low sulfate iron concentration. British Patent No. 1,520,877 (UKAEA) (Aug. 9, 1978) describes a process for the secondary recovery of oil where treated water is injected at a high pressure through an injection well. Prior to injection, raw sea water, after first treatment with an ultrafiltration apparatus, is fed to a first reverse-osmosis apparatus at a pressure of about 1,000 psi and thereafter to a second reverse-osmosis apparatus at a pressure of about 1,500 psi to produce a final product water concentrate which is utilized. A subsequent British patent issued to the UKAEA, No. 1,522,595 (Aug. 23, 1978) describes a two-step injection process wherein water of a relatively low ionic concentration is first injected into the oil reservoir through the injection well, causing the pores of clay-like particles to gradually close until pores of the rock near the outlet well become filled with oil. Thereafter, water having the predetermined higher ionic concentration is injected, causing the clay-like particles to shrink so that water can flow through the spaces and force the oil to the outlet well.

These documents teach that, by treating the injection water source by ultrafiltration followed by two sequential reverse-osmosis treatments, using desalination units that were state-of-the-art at that time, it was possible to adjust the ionic composition to desirable levels. Also contained is the teaching that certain divalent ions, e.g. sulfates, react with counterions, e.g. barium ions, found in the rock reservoir to form insoluble sulfates, the result of which can be pore blockage as a result of precipitation of such sulfates. The intention appears to be to adjust the ionic composition to remove divalent runs, but no explanation is given as to how such removal is effected. The initial treatment by ultrafiltration is said to remove minute particles less than a micron in diameter, and cellulose acetate RO membranes are used to adjust the composition of the concentrate which is the desired end product.

U.S. Pat. No. 4,723,603 to Plummer (Marathon Oil Company) issued Feb. 9, 1988 took advantage of subsequent developments in separation membrane technology to provide a more efficient process for treating water for use in secondary oil recovery by removing precursor ions, i.e. bivalent anions and cations, from the water being injected while keeping a desired concentration of soluble monovalent ions in the water. Such was accomplished using a polyamide semipermeable membrane of the nanofiltration type sold under the tradename FilmTec NF-40. The membrane was of the reverse-osmosis type, but it was alleged to effect an adequate rejection of bivalent ions, such as sulfate, at 22° C. while allowing about 91–92% of monovalent ions, e.g. sodium, chlorine, etc., to pass in order to effect the clay stabilization taught to be desirable in the aforementioned British patent.

Although the process taught in the '603 patent was worthwhile in reducing two RO treatment-steps to one membrane treatment step, it too experienced significant limitations. It was often unable to achieve desired concentrations in a single step, and it was not able to operate in warm or tropical regions (where the temperature of the water being treated is substantially higher than that found in the North sea and other drilling locations where offshore oil production was occurring) without expensive cooling of the feedwater. Therefore, improved processes continue to be sought.

BRIEF SUMMARY OF THE INVENTION

Applicant has provided an enhanced method of secondary oil recovery, particularly relating to offshore oil operations. In Applicant's improved method, ambient temperature seawater including warm seawater from tropical regions, as well as seawater that might be raised in temperature as a result of energy absorbed during pumping, which seawater may contain a fairly high chloride ion content, can be directly treated without temperature regulation and then injected into a subterranean hydrocarbon-bearing formation by a single step treatment with a spirally-wound separation unit comprising sheets of semipermeable membrane material and feed spacer material. Preferably, the membrane is a polyamide nanofiltration membrane formed by interfacial condensation of piperazine and an aromatic triacyl chloride, e.g. TMC, or a mixture of TMC and IPC, upon an ultrathin polyurethane film, which is in turn supported on a standard porous support sheet material made of polysulfone or the like; more preferably, the membrane is of the type sold by Osmonics/Desal as their nanofiltration membrane DS-5. The membrane in sheet form is spirally wound in cartridges with feed spacer material that provides parallel ribs which form about 3 to 10 axially extending channels per inch, which ribs are interconnected by transverse filaments; this arrangement provides concentration-polarization-enhancing effects at the surface of the polyamide membranes which keeps calcium sulfate and minute solids from precipitating and enhances the transmission of chloride ion into the permeate. The overall characteristics of the system permit effective and efficient operation with saline water at a temperature between about 2° C. and 75° C. or even higher. As a result, treatment can be carried out of warm or even tropical saline water directly in a one-step operation without precooling or without the use of preliminary ultrafiltration or chemical treatment.

In a more particular aspect, the invention provides a method for the secondary recovery of petroleum from a location below a body of saline water by flooding a permeable petroleum-bearing stratum, which method comprises treating saline water from said body to remove at least about 95% of all divalent anions and to simultaneously increase the chloride ion content of said saline water by pumping said saline water on a single pass through a semipermeable membrane, and then pumping said treated saline water under pressure into said permeable stratum.

In a further more particular aspect, the invention provides a seawater treatment system for providing a divalent anion-reduced and chloride ion-enhanced aqueous feed for flooding a permeable petroleum-bearing stratum for the secondary recovery of petroleum from a location below the ocean or other body of water, which system comprises a spirally-wound cartridge containing sheets of semipermeable membrane and feed spacers having an axially extending parallel channel configuration that creates feed passageways in such spiral cartridge which negate membrane fouling from suspended solids and precipitation and thus obviate the need for any ultrafiltration prefiltering of seawater, and means for pumping seawater being treated to said membrane at a pressure of not greater than about 300 psig, said membrane being a polyamide continuous film formed from the condensation reactor of a piperazine and an acyl chloride, which film is supported upon a porous film of a different polymeric material, which is in turn supported upon a porous support of polysulfone or the like.

DETAILED DESCRIPTION OF PREFERRED EMBODIMENTS

Applicant's improved method for secondary recovery of petroleum from a location below a body of saline water by flooding the permeable petroleum-bearing stratum utilizes a three-layer separation membrane in combination with a particular feed spacer arrangement which is capable of operation under conditions of relatively high ambient temperature and in the presence of some suspended solids in a spirally-wound membrane cartridge to produce a permeate that is substantially free of divalent ions but which contains desired high levels of monovalent ions, i.e. chlorides. This method facilitates the transformation in a single treatment step of source water, e.g. tropical seawater, into a liquid having such characteristics that it can be pumped directly into the permeable stratum to effect the desired flooding and secondary oil recovery. Moreover, operation can be carried out under a fairly broad range of pH conditions so as to facilitate appropriate periodic cleaning of such cartridges, as would be expected to be necessary when operating with locally available water sources at ambient temperatures. For example, Applicant's method is able to efficiently perform with ambient seawater at temperatures from about 2° C. to about 80° C. while still remaining effective to reject over 95%, and frequently over 99%, of divalent sulfate anions while simultaneously actually increasing the chloride content in the resultant permeate from that in the saline feed to a level desired for the particular permeable stratum being flooded.

Very generally, the improvement relates to offshore oil production technology and more particularly to secondary oil recovery from rock containing a reservoir of oil or from permeable oil-bearing strata. The invention permits use of a local saline water source, e.g. seawater at ambient temperatures without cooling, and in a single treatment step, it produces a permeate appropriate for pumping under pressure into the subterranean location to effect flooding of the permeable stratum with potential plugging. The treatment unit comprises a semipermeable membrane cartridge of the standard spiral-wound configuration wherein the feed liquid is pumped axially through the unit in a cylindrical pressure vessel, flowing in passageways provided by sheet-like feed spacer material disposed between facing membrane surfaces of spirally-wrapped envelopes comprising an inner permeate transmission material sandwiched between two sheets of preferably nanofiltration membrane material. The permeate is carried to a central collection tube while the liquid feed that is being concentrated that does not pass through the semipermeable membrane of one of the cartridges in the pressure vessel exits the opposite end of the unit and may be used as a feed to another pressure vessel or discharged back to the water source. If recover of 75% to 90% of the feedwater is being achieved, the ultimate concentrate would normally not be recycled. The preferred nanofiltration membrane material is a three-layer composite that has the ability to operate effectively and create the permeate having the desired concentrations of ions at ambient temperatures as high as about 75° C. or 80° C. It is frequently operated in the range of 25° C. to 35° C. and does not particularly require high pressure or high velocity of flow through the units to function effectively. Moreover, the particular feed spacer design permits fairly wide ranges of throughput through the units without fouling from suspended solids while achieving concentration polarization at the membrane surface, which results in the ability to increase the monovalent ion concentration, e.g. chloride, in the permeate above that of the feedwater. The membrane very effectively removes the undesirable bivalent anions at a pressure of 150 to 200 psig, rejecting at least 95% and usually more than 99% of such, although it can be run at higher pressures if desired for increased flux, and the preferred membrane material can withstand operation as high as about 600 psig. For example, seawater can be pumped through the units at a pressure of about $21.1 \times 10^4$ kg/m$^2$ (300 psia) pressure over extended periods of time without unduly affecting, e.g. compacting, the membrane; however, it is usually possible to operate at pressures in the range of 150 to 200 psig. The permeate from this treatment is then directly used for high pressure flooding of the subterranean permeable stratum.

Overall, the process for such flooding to enhance secondary oil recovery requires water which is free from particulate inorganic and organic solids and substantially free from divalent anions, e.g. sulfate, (which would form undesirable precipitates with barium, calcium and/or magnesium ions in the rock formation) to avoid blocking of the otherwise permeable formations. Moreover, it is also considered important that the water being injected for the flooding has similar ionic strength to the water inherently present in the permeable stratum so that a rock stratum does not experience a change in ionic strength when the flooding occurs, which would cause the swelling of clays and the like that would result in substantial decrease and/or blockage of the permeable passageways therein. Frequently, the ionic strength of the stratum will be up to about 10% higher than the ionic strength of the overlying saline water, e.g. seawater. The ability of the improved system to provide water which meets such criteria allows efficient operation and secondary recovery of oil even from subterranean permeable strata that have relatively high calcium and/or magnesium concentrations and/or even with feedwater sources that have high concentrations of calcium and/or magnesium.

Applicant's preferred three-layer membrane is of the nanofiltration type and has mechanical and semipermeability characteristics uniquely suited to producing a saline water permeate of a desired character under operating conditions that promote economy of operation is a key factor in achieving success. Nanofiltration membranes are generally characterized as semipermeable membranes that reject divalent ions to a greater extent than monovalent ions are rejected. Moreover, fabrication of these particular membranes into a spirally-wound cartridge which incorporates a feed spacer arrangement that has a low pressure drop and can accommodate feedwater carrying some suspended solids further improves the overall economy of the operation. This overall arrangement avoids the need for a pretreatment step, such as using an ultrafiltration (UF) membrane, to remove salts and/or solids that might otherwise clog or foul the membrane or treating the feedwater with chemicals to prevent precipitation so long as a clean aqueous feed is available. Of course, if such were not the case, e.g. if seawater intake for an offshore drilling rig were located near the surface and in close vicinity to a shipping lane, one might wish to use a UF prefilter to remove contamination by oil and the like. As previously indicated, the ability of this three layer membrane to almost totally reject all divalent anions while allowing enhanced passage of certain monovalent ions to provide a permeate that is higher in chloride ion than the feedwater, even at high operating temperatures, e.g. 25° C. to 35° C., is considered to be particularly valuable.

The feed spacers themselves are preferably formed of polymeric material, e.g. polypropylene, as by extruding, to have parallel ribs that are interconnected by transverse filaments of a lesser height than the ribs. The ribs are spaced apart so as to provide between about 3 and 10 axially extending channels per inch, and the transverse filaments are of a height less than one-half that of the ribs, preferably not greater than about 20–25% of the height of the ribs. Preferably, the cross filaments are located generally centrally of the height of the ribs. Spacers of the design create a concentration-polarization-enhancing effect in the form of a layer adjacent the surface of the membrane which layer keeps calcium sulfate and the like from precipitating onto the membrane. Thus, neither ultrafiltration prefiltering nor the use of antiscalant chemicals is needed so long as the feed is relatively clean.

Whereas seawater reverse-osmosis membranes have traditionally operated with feed pressures of 300 to 500 psig or even higher, i.e. 600 psig, it is possible to operate these nanofiltration membrane units in-a range of 150 to 200 psig because, as it can be seen, the sodium chloride is not being rejected but is being allowed to flow through the membrane as part of the permeate, while the divalent ions are being rejected. As a result, sodium chloride makes substantially no contribution to the effective osmotic pressure of the solution with respect to these nanofiltration membranes, and the osmotic pressure is the result mainly of the concentrations of the divalent ions. This allows effective operation, for example, at an input pressure of about 200 psig and an outlet pressure of, e.g., 140 psig after the eventual concentrate has traveled in axial flow sequentially through, for example, three elongated pressure vessels for a total of some 30 feet. However, if desired for increased flux, operation at such higher pressures may be used.

Using this membrane and this type of a spirally-wound cartridge, seawater can be supplied at a pressure between about 150 and about 200 psig to operate the system under conditions which provide a permeate flux of at least about 20 gallons per square foot per day of membrane surface and in configurations of units that will achieve 50%, 75% or even 90% of recovery of product. Moreover, operation is feasible even with seawater at a temperature of about 30° C. or above to, in a single pass, produce a permeate that includes a greater concentration of chloride than the feed, e.g. about 18,000 ppm of chloride ion and less than 50 ppm of sulfate ion. Such a permeate can be obtained by treating seawater having a chloride concentration of about 1650 ppm to actually raise its chloride concentration while simultaneously essentially depleting the permeate of its bivalent anion concentration and bivalent cations such as Ca, Ba and Mg.

It has been found that, by using this type of feed spacer material having ribs that form 3 to 10 channels per inch and having transverse, e.g. perpendicular, cross filaments of a height only about one-fifth or less than the height of the ribs and preferably spaced generally centrally of the height of the ribs, in combination with this particular three layer nanofiltration membrane, this increase in chloride concentration can be accomplished while, at the same time, minor amounts of suspended solids can be tolerated without difficulty. As a result, when an operation is being carried out, for example, in the open ocean, by placing the seawater intake about 10 meters or more below the ocean surface, one can routinely obtain water that can be treated in a single pass through such a unit without any pretreatment and then used for flooding to achieve secondary oil recovery. As earlier mentioned, it may be desirable to employ UF pretreatment if the source water is contaminated. By single pass, it should be understood that what is meant is that the permeate only passes once through the three layer membrane, starting from when it is first pumped into a unit, e.g. at a feed pressure of, for example, 150 to 200 psig. It should be understood, however, that these spirally-wound nanofiltration units are operated as cross flow reverse-osmosis units wherein high pressure input seawater is flowing through one or more elongated pressure vessels, each of which vessels may include a plurality of spirally-wound cartridges, arranged end-to-end. Whereas there may only be a single feed pump even for a large volume operation, a system may handle a very large volume of liquid by creating a configuration of pressure vessels, perhaps initially feeding to 20 different pressure vessels in parallel, each of which may include five or six 40-inch long cartridges. Thus, the seawater that exits the pressure vessel has traveled essentially 20 feet. Thereafter, the concentrate discharge flows from these 20 separate pressure vessels might be pooled and used to feed 10 additional vessels having exactly the same construction; this would produce then 10 more permeate streams and 10 concentrate streams of still lesser volume. In turn, these 10 concentrate streams might be combined and used to feed five more of these pressure vessels, each about 20 feet in length; these final concentrate streams would produce five more permeate streams and five concentrate streams which would normally be returned to the ocean.

All of the permeate streams, i.e. the 20 streams from the first set, the 10 streams from the second set and the 5 streams from the third set would then be combined and used to directly flood the subterranean permeable stratum. In an operation such as this, it is possible to recover about 90% of the input volume as permeate, i.e. only 10% of the input volume being returned to the ocean, while the resultant permeate will have a divalent anion content less than 5% of its original content and in many instances less than 1% of its starting concentration and, at the same time, the chloride concentration may actually be up to about 10% greater. These surprising effects are believed to result from the overall combination of membrane and spiral-wound element construction, which also facilitates operation without significant fouling in the open ocean with no pretreatment of the ambient water being pumped. Such operation can be carried out at tropical ocean water temperatures of 25° C. to 35° C. and even at temperatures of 40° C. and above that might be encountered in the Persian Gulf or a similar location. It is believed that these surprising results can be attributed to the resistance of this particular three-layer membrane to fouling in combination with the build-up of a high sodium chloride concentration layer near the surface of the membrane which is achieved using the spirally wound structure described and regulating the flow rate through the system to produce a flux not greater than 25 gfd and preferably between about 15 and 20 gfd. This concentration polarization effect is believed to be enhanced by the ability of such system to operate at such relatively low axial flow rates through the pressure vessel without fouling, and it is believed that such high salt concentrations at the membrane surfaces results both in minimal fouling by keeping calcium sulfates and the like in solution and enhanced transport of chloride ion through the membrane which creates the surprising 10% increase in concentration over the feed liquid.

The following experiments verify the achievements of spirally-wound cross flow semipermeable membrane cartridges of this type to treat aqueous solutions containing a substantial amount of divalent ions at a variety of temperatures in a single pass through the membrane. To illustrate the above-described invention, certain laboratory experimentation was carried out which is set forth hereinafter.

Rejection Profile Changes of a Membrane Cartridge at Varying Temperatures from 22° C. to 70° C.

A spirally wound semipermeable membrane cartridge utilizing the DS-5 nanofiltration membrane was installed in a stainless steel test loop and flushed with deionized water that was then drained from the system. 200 g of MgSO$_4$ was then slowly dissolved into 20 liters of the deionized water, and a positive displacement pump was then started and used to pump the liquid through the system at about 200 psig, with both the permeate and concentrate streams recycling back into the feed tank.

After the system had been run in recycle mode for roughly 15 min., about 250 mL of permeate was collected directly from the permeate outlet, and about 250 mL of feed was removed with a ladle from the top of the feed tank. The permeate outlet was then directed to a 1000 mL graduated cylinder, and the time to collect 1 liter of permeate was measured, which permeate was then immediately returned to the feed tank. The temperature of the concentrate stream was also measured.

Next, an immersible electric heater was inserted into the feed tank and activated. The temperature of the concentrate stream was monitored until this temperature reached 98° F. (37° C.). At this time, the heater was deactivated, and the procedure for collecting samples and recording data was repeated. This procedure was repeated again at 128° F. (53° C.) and at 158° F. (70° C.), at which time, the pump was stopped. The test was repeated two more times on separate days, and the results are independently shown.

The collected permeate and feed samples were analyzed for sulfate concentration by testing for conductivity at 72° F. (22° C.) using a field conductivity meter.

The pressure, temperature, flow and conductivity data for the three trials are shown in Table 1. Apparent rejections for each trial are also shown in Table 1.

TABLE 1

Pressure, Temperature, Flow, and Conductivity Data for the Three Trials.

| Pressure psi | Temp C. | TCF | Flow ml | Time s | Feed µS | Permeate µS | as Run Flow Rate GPM | as Run Apparent Rejection | Normalized Flow Rate GPM | Normalized Apparent Rejection |
|---|---|---|---|---|---|---|---|---|---|---|
| | | | | | Trial 1 | | | | | |
| 200 | 22 | 0.924 | 1000 | 204 | 5540 | 21.9 | 0.078 | 99.60% | 0.084 | 99.63% |
| 200 | 37 | 1.374 | 1000 | 138 | 5580 | 23.3 | 0.115 | 99.58% | 0.084 | 99.43% |
| 200 | 53 | 2.081 | 1000 | 100 | 5710 | 32.1 | 0.159 | 99.44% | 0.076 | 98.83% |
| 200 | 70 | 3.027 | 1000 | 84 | 5690 | 43.0 | 0.189 | 99.24% | 0.062 | 97.71% |
| | | | | | Trial 2 | | | | | |
| 200 | 22 | 0.924 | 1000 | 166 | 5220 | 15.6 | 0.096 | 99.70% | 0.103 | 99.72% |
| 200 | 37 | 1.374 | 1000 | 124 | 5250 | 17.6 | 0.128 | 99.66% | 0.093 | 99.54% |
| 200 | 53 | 2.081 | 1000 | 93 | 5330 | 21.7 | 0.170 | 99.59% | 0.082 | 99.15% |
| 200 | 70 | 3.027 | 1000 | 83 | 5350 | 26.8 | 0.191 | 99.50% | 0.063 | 98.48% |
| | | | | | Trial 3 | | | | | |
| 200 | 22 | 0.924 | 1000 | 166 | 5000 | 33.0 | 0.096 | 99.34% | 0.103 | 99.39% |
| 200 | 37 | 1.374 | 1000 | 128 | 5110 | 34.3 | 0.124 | 99.33% | 0.090 | 99.08% |
| 200 | 53 | 2.081 | 1000 | 91 | 5110 | 39.3 | 0.174 | 99.23% | 0.084 | 98.40% |
| 200 | 70 | 3.027 | 1000 | 79 | 5240 | 49.3 | 0.201 | 99.06% | 0.066 | 97.15% |

The percent apparent rejection is defined in Equation 1.

$$\% \text{ Apparent Rejection} = \left( \frac{\mu S \cdot cm_{Feed} - \mu S \cdot cm_{Permeate}}{\mu S \cdot cm_{Feed}} \right) \times 100\% \qquad \text{Eq. 1}$$

where $\mu S \, cm_{Feed}$ is the conductivity of the feed sample, and $\mu S \, cm_{Permeate}$ is the conductivity of the permeate sample. The apparent rejection indicates the percent MgSO$_4$ that is rejected from the feed and does not reveal any information regarding the true rejection at the membrane surface.

Normalized flow rates and normalized rejections are also shown in Table 1. The flow rates are normalized to 200 psi and 77° F. according to Equation 2.

$$\text{Normalized Flow Rate} = \frac{Q_{System} \cdot PCF}{TCF} \qquad \text{Eq. 2}$$

where System is the actual measured flow rate at the system pressure and temperature, PCF is the Pressure Correction Factor, and TCF is the Temperature Correction Factor. For this study, because the system pressure is equal to the normalized pressure, the Pressure Correction Factor is omitted. The Temperature Correction Factor is defined in Equation 3.

$$TCF = \exp\left[\frac{\Delta H}{R} \cdot \left(\frac{1}{T_{Norm}} - \frac{1}{T_{System}}\right)\right] \qquad \text{Eq. 3}$$

where $\Delta H$ is the activation energy (equal to 5000 cal/mole K for polysulfone), r is the universal gas constant, $T_{Norm}$ is the absolute temperature chosen for normalization, a and $T_{System}$ is the actual measured absolute temperature of the system. The rejections are normalized also to 200 psi and 77° F. according to Equation 4.

% Normal Rejection =

$$\left(\frac{\mu S \cdot cm_{Feed} - \mu S \cdot cm_{Permeate} \cdot \frac{PCF}{TCF}}{\mu S \cdot cm_{Feed}}\right) \times 100\% \qquad \text{Eq. 4}$$

where again, the Pressure Correction Factor is unity and is omitted.

Plots of apparent rejection versus temperature and flow rate versus temperature are shown together in FIG. 1. Plots of temperature normalized rejection versus temperature, and a temperature normalized flow rate versus temperature, are shown together in FIG. 2.

These test results show that $MgSO_4$ rejection of the DS-5 membrane declines only very slightly (based on conductivity readings) over the range of 22–70° and importantly, at 70° C., the rejection is still above 99.0%. Based upon normalized permeate flow rate, the rejection drops to about 98% but is still considered to be excellent.

Rejection Profile Changes for Permeate at Varying Recovery Percentages

A spirally-wound nanofiltration filtration membrane cartridge (incorporating the DS-5 membranes) was installed in a test loop and then run under conditions of relatively low feed flow using a solution of sea salt that contained about 19,000 ppm of chloride and 3,500 ppm of sulfate in 20 liters of deionized water at 35° C. A four-inch diameter spirally wound element was used at a pumping flow of about 5 gallons per minute (gpm) at a pressure that would produce a membrane flux of about 25 gallons per sq. ft. per day (gfd). The concentrate stream was returned to the feed tank, and the first test was run until 10 liters of permeate had been recovered, i.e. a recovery of 50%. The test was then repeated increasing the feed pressure of the system to maintain the same rate of permeate flux and running until 15 liters of permeate had been obtained, equal to a 75% recovery. The test was then repeated a third time again similarly increasing the pressure to achieve the target permeate flux and operating until 18 liters of permeate had been recovered, a recovery of 90%. The test results are set forth in Table 2 which follows.

TABLE 2

| Recovery | Cl⁻ ion increase in Permeate | $SO_4^-$ ion Rejection |
|---|---|---|
| 50% | +8.9% | 100% |
| 75% | +9.8% | 99.5% |
| 90% | +12.9 | 99.4% |

Review of the test results shows that, as recovery increases from 50% to 90%, there is a very slight drop-off in the amount of rejection of the bivalent anions but rejection is still excellent at 99.4% for 90% recovery at 35° C. Operation under these pressures and flow conditions shows that the amount of chloride ion in the final permeate increases slightly as the recovery is increased which, of course, can be advantageous in several aspects, particularly when even higher chloride concentrations are desired in the water to be used in flooding the subterranean permeable strata.

Although the invention has been described with regard to particular features which constitute the best mode known to the inventor carrying out this invention, it should be understood that various changes and modifications as would be obvious to one having the ordinary skill in this art may be made without deviating from the scope of the invention which is set forth in the claims appended hereto. For although it may be advantageous to operate in the range of about 150–200 psig, higher pressures can be employed if it is desired to achieve greater permeate flux. Likewise, some pretreatment filtering, e.g. UF, may be used should there be contamination in the feed source even though such is unnecessary for a clean feed. The disclosures of the previously enumerated patents are expressly incorporated herein by reference.

What is claimed is:

1. A method for the secondary recovery of petroleum from a location below a body of seawater by flooding a permeable petroleum-bearing stratum, which method comprises treating seawater from said body at a temperature between about 22° C. and about 75° C. to remove at least about 99% of all divalent anions and to simultaneously increase the chloride ion content of said seawater by at least 10% by pumping said seawater on a single pass through a nanofiltration membrane formed of a polyamide film created by the condensation reaction of a piperazine and an acyl chloride which film is supported upon a porous film of a different polymeric material, and then pumping said treated seawater under pressure into said permeable stratum.

2. The method according to claim 1 wherein said porous supporting film is a polyurethane film about 1500–2000 angstroms thick.

3. The method in accordance with claim 1 wherein seawater at a temperature of about 30° C. or above is treated in a single pass through said membrane to provide a permeate containing at least about 18,000 ppm of chloride ion and less than 50 ppm of sulfate ion.

4. The method according to claim 3 wherein seawater is pumped to said membrane at a flow rate such that the rate of flow of concentrate is no more than about 20% of the rate of flow of permeate.

5. The method according to claim 1 wherein said seawater is pumped to said membrane at a pressure between about 150 and about 200 psig and provides a permeate flux of at least about 20 gallons/sq. foot/day.

6. The method according to claim 1 wherein said membrane is present in sheet form as a part of a spirally-wound cartridge.

7. The method according to claim 6 wherein said seawater being treated is pumped through spacers in the form of parallel ribs that provide about 3 to 10 axially extending channels per inch, which ribs are interconnected by transverse filaments of lesser size than said ribs, said spacers creating a concentration-polarization-enhancing effect at the feed surface of said membrane, which effect also keeps Ca sulfates from precipitating onto said membrane, negating the need for any ultrafiltration prefiltering or anti-sealant chemicals.

* * * * *